United States Patent
Wadell et al.

(10) Patent No.: US 9,755,766 B2
(45) Date of Patent: Sep. 5, 2017

(54) FRONT END MODULE FOR AUTOMATIC TEST EQUIPMENT

(71) Applicant: Teradyne, Inc., North Reading, MA (US)

(72) Inventors: Brian C. Wadell, Reading, MA (US); Daniel Rosenthal, Boxford, MA (US)

(73) Assignee: Teradyne, Inc., North Reading, MA (US)

( * ) Notice: Subject to any disclaimer, the term of this patent is extended or adjusted under 35 U.S.C. 154(b) by 0 days.

(21) Appl. No.: 14/946,311

(22) Filed: Dec. 7, 2015

(65) Prior Publication Data

US 2017/0163358 A1    Jun. 8, 2017

(51) Int. Cl.
*H04B 17/29* (2015.01)
*H04B 1/10* (2006.01)

(52) U.S. Cl.
CPC .......... *H04B 17/29* (2015.01); *H04B 1/1027* (2013.01)

(58) Field of Classification Search
CPC .... H04B 17/0085; H04B 17/00; H04B 17/29; H04B 17/15; H04B 17/11; H04B 17/19; H04B 17/24; H04B 3/46; H04B 1/1027; H04L 43/50; H04L 12/26; H04L 12/2697
USPC ......................................... 375/224, 219–222
See application file for complete search history.

(56) References Cited

U.S. PATENT DOCUMENTS

| 5,572,160 | A | | 11/1996 | Wadell | |
|---|---|---|---|---|---|
| 5,867,123 | A | * | 2/1999 | Geyh | H01Q 21/22 342/173 |
| 5,889,936 | A | * | 3/1999 | Chan | G01R 31/31935 714/39 |
| 6,618,305 | B2 | * | 9/2003 | Ernst | G01R 31/31917 365/189.07 |
| 6,658,613 | B2 | * | 12/2003 | Rearick | G01R 31/31926 702/177 |
| 7,167,682 | B1 | * | 1/2007 | Madsen | H04B 17/20 455/115.1 |
| 7,233,599 | B2 | * | 6/2007 | Deas | G01R 31/3191 370/412 |
| 7,327,153 | B2 | * | 2/2008 | Weinraub | G01R 31/31917 324/756.01 |

(Continued)

OTHER PUBLICATIONS

International Search Report for PCT/US16/48114, 3 pages ( Dec. 5, 2016).
Written Opinion for PCT/US16/48114, 8 pages ( Dec. 5, 2016).

*Primary Examiner* — Emmanuel Bayard
(74) *Attorney, Agent, or Firm* — Choate, Hall & Stewart LLP; Paul Pysher

(57) ABSTRACT

Example automatic test equipment (ATE) includes: a test instrument for outputting test signals to test a device under test (DUT), and for receiving output signals from the DUT, with the test instrument including a front-end module, and with the front-end module including internal circuitry for performing functions relating to the DUT; and external circuitry for performing the functions relative to the DUT via the test instrument, with the external circuitry being external to the front-end module and being shared among multiple front-end modules or channels of the test instrument. The test instrument is configurable to use either (i) the internal circuitry, (ii) the external circuitry, or (iii) a combination of circuits in the internal circuitry and the external circuitry to perform the functions.

25 Claims, 3 Drawing Sheets

(56) References Cited

U.S. PATENT DOCUMENTS

| | | | | |
|---|---|---|---|---|
| 7,432,751 B2* | 10/2008 | Fang | ............ | G01R 25/04 327/107 |
| 7,450,633 B2* | 11/2008 | Uchino | ............ | G06F 1/0335 375/224 |
| 7,471,753 B2* | 12/2008 | Walker | ............ | G06F 1/025 375/354 |
| 7,477,875 B2* | 1/2009 | Zhang | ............ | H04B 17/0085 455/115.1 |
| 7,486,096 B2* | 2/2009 | Dhong | ............ | G01R 31/3004 324/750.3 |
| 7,680,493 B2* | 3/2010 | Scranton | ............ | B82Y 25/00 324/750.3 |
| 7,683,647 B1 | 3/2010 | Scharrer et al. | | |
| 7,873,884 B2* | 1/2011 | Yin | ............ | G01R 31/2822 324/754.31 |
| 7,888,947 B2* | 2/2011 | Singleton | ............ | G01R 31/3191 324/555 |
| 8,000,921 B2* | 8/2011 | Heaton | ............ | G01R 31/31708 324/76.53 |
| 8,774,729 B2* | 7/2014 | Olgaard | ............ | H04B 17/0085 324/537 |
| 8,788,892 B2* | 7/2014 | Barker, Jr. | ............ | H04W 76/025 370/395.5 |
| 8,867,372 B2* | 10/2014 | Olgaard | ............ | H04W 48/06 370/242 |
| 8,918,060 B2* | 12/2014 | Duperray | ............ | H04B 17/0027 455/67.11 |
| 8,982,936 B2* | 3/2015 | Yang | ............ | H04B 17/0085 370/235 |
| 9,003,253 B2* | 4/2015 | Olgaard | ............ | G01R 31/318371 714/734 |
| 9,007,259 B1* | 4/2015 | Minassian | ............ | G01S 7/40 342/165 |
| 9,083,647 B2* | 7/2015 | Olgaard | ............ | H04L 43/50 |
| 9,088,521 B2* | 7/2015 | Olgaard | ............ | H04L 43/50 |
| 9,167,459 B2* | 10/2015 | Olgaard | ............ | H04B 17/00 |
| 9,232,419 B2* | 1/2016 | Olgaard | ............ | H04W 24/06 |
| 9,319,154 B2* | 4/2016 | Olgaard | ............ | H04B 17/00 |
| 9,319,912 B2* | 4/2016 | Hirst | ............ | H04W 24/08 |
| 2003/0005373 A1* | 1/2003 | Michael | ............ | G11C 29/56 714/719 |
| 2003/0167427 A1* | 9/2003 | Kraus | ............ | G11C 29/46 714/718 |
| 2004/0177293 A1 | 9/2004 | Ricca et al. | | |
| 2007/0099586 A1* | 5/2007 | Kerth | ............ | H04M 1/24 455/131 |
| 2007/0171399 A1* | 7/2007 | Froggatt | ............ | G01N 21/274 356/73.1 |
| 2008/0056050 A1* | 3/2008 | Takai | ............ | G11C 8/10 365/230.01 |
| 2010/0007355 A1* | 1/2010 | Olgaard | ............ | H04B 17/327 324/601 |
| 2010/0109674 A1* | 5/2010 | Kuramochi | ............ | G01R 31/31926 324/537 |
| 2011/0006794 A1* | 1/2011 | Sellathamby | ............ | G01R 31/3025 324/754.03 |
| 2011/0273197 A1* | 11/2011 | Banerjee | ............ | G01R 31/3167 324/750.3 |
| 2012/0017118 A1 | 1/2012 | Barakat et al. | | |
| 2012/0109048 A1* | 5/2012 | Masoud | ............ | A61N 1/37276 604/66 |
| 2012/0198292 A1* | 8/2012 | Yuzurihafa | ............ | G11C 29/56 714/718 |
| 2013/0151185 A1* | 6/2013 | Yagoshi | ............ | G01R 31/31709 702/64 |
| 2014/0103907 A1 | 4/2014 | Muecke et al. | | |
| 2014/0210503 A1* | 7/2014 | Tam | ............ | G01R 19/0092 324/754.03 |
| 2014/0273873 A1* | 9/2014 | Huynh | ............ | H04B 17/008 455/67.12 |
| 2014/0285227 A1* | 9/2014 | Serrels | ............ | G01R 31/311 324/754.23 |
| 2015/0138995 A1* | 5/2015 | NarayanaMoorthy | ............ | H04L 5/0048 370/252 |
| 2015/0192639 A1* | 7/2015 | Olgaard | ............ | G01R 31/3177 714/726 |
| 2015/0244477 A1* | 8/2015 | Hirst | ............ | H04B 17/15 455/67.14 |
| 2015/0256274 A1* | 9/2015 | Olgaard | ............ | H04B 17/24 455/67.14 |
| 2015/0309101 A1* | 10/2015 | Ballo | ............ | G01R 29/26 324/614 |
| 2015/0377967 A1* | 12/2015 | Thiruvengadam | ............ | G01R 31/31715 714/731 |
| 2016/0072530 A1* | 3/2016 | El-Hassan | ............ | H03F 1/0227 455/114.2 |
| 2016/0072594 A1* | 3/2016 | Yuan | ............ | H04B 17/16 455/424 |
| 2016/0072686 A1* | 3/2016 | Olgaard | ............ | H04L 43/50 370/252 |
| 2016/0109511 A1* | 4/2016 | Kuo | ............ | G01R 31/2884 324/750.3 |
| 2016/0131709 A1* | 5/2016 | Yoo | ............ | G01R 31/31721 324/762.01 |
| 2016/0187243 A1* | 6/2016 | Schwab | ............ | G01N 3/30 73/12.09 |
| 2016/0197684 A1* | 7/2016 | Tsai | ............ | H04B 17/29 455/67.14 |
| 2016/0197685 A1* | 7/2016 | Tsai | ............ | H04B 17/17 370/242 |
| 2016/0204881 A1* | 7/2016 | Chung | ............ | H04B 17/00 455/67.14 |

* cited by examiner

FRONT END MODULE FOR AUTOMATIC TEST EQUIPMENT

TECHNICAL FIELD

This specification relates generally to a front end module for use in automatic test equipment.

BACKGROUND

Automatic test equipment (ATE) includes electronics for sending signals to, and receiving signals from, a device under test (DUT) in order to test the operation of the DUT. The ATE includes test instruments, such as radio frequency (RF) instruments, which are configured to test RF devices. Test instruments include front-end modules (FEMs), which connect, through a device interface board (DIB), to a device under test (DUT). An RF instrument for automated testing makes components or resources available to DUT pins for testing. For example, a receiver and signal source connect, via a FEM and a DIB, to the DUT to stimulate the DUT and measure its response. These resources can be bulky and expensive due to their high performance and high frequency operation. For example, shielding in the form of metal enclosures with gasketing may be required to separate circuit elements. Because of their size and cost, typically these resources are shared across multiple sites or multiple DUT pins to reduce cost. However, sharing resources introduces tradeoffs in test efficiency. For example, sharing may require tests to be done serially with the same resource used for a first test and then later used for a second test.

SUMMARY

Example ATE comprises: a test instrument for outputting test signals to test a DUT, and for receiving output signals from the DUT, with the test instrument comprising a front-end module that comprises: internal source circuitry to generate the test signals to be provided by the test instrument; and internal receiver circuitry to receive the output signals. The ATE also comprises source circuitry, all or part of which is external to the front-end module to generate test signals to be output by the test instrument; and receiver circuitry, all or part of which is external to the front-end module to receive the output signals. The test instrument is configurable to use (i) the internal source circuitry and the internal receiver circuitry, (ii) the external source circuitry and the external receiver circuitry, (iii) or a combination comprised of the internal source circuitry, the internal receiver circuitry, the external source circuitry, or the external receiver circuitry. The example ATE may include any one or more of the following features, either alone or in combination.

At least one of the external source circuitry or the external receiver circuitry may be sharable across multiple front-end modules. Both the external source circuitry and the external receiver circuitry may be sharable across multiple front-end modules. The internal source circuitry and the internal receiver circuitry may be part of an internal transceiver, and the external source circuitry may have better phase noise performance than the internal source circuitry. The internal source circuitry and the internal receiver circuitry may be part of an internal transceiver, and the external receiver circuitry may have better phase noise performance than the internal receiver circuitry. The external source circuitry may provide better performance than the internal source circuitry with respect to one or more of the following parameters: frequency resolution, phase noise, harmonic distribution, spurious emissions, error vector magnitude, adjacent channel power ratio, modulation bandwidth, two-tone intermodulation, or inband intermodulation. The external receiver circuitry may provide better performance than the internal receiver circuitry with respect to one or more of the following parameters: frequency resolution, phase noise, harmonic distribution, spurious emissions, error vector magnitude, adjacent channel power ratio, modulation bandwidth, two-tone intermodulation, or inband intermodulation.

The ATE may further comprise: one or more processing devices to configure the test instrument to use either (i) the internal source circuitry and the internal receiver circuitry, or (ii) external source circuitry and external receiver circuitry, or (iii) a combination comprised of the internal source circuitry, the internal receiver circuitry, external source circuitry, or external receiver circuitry. The external source circuitry may comprise a first synthesizer and the internal source circuitry may comprise a second synthesizer, with the first synthesizer having better performance than the second synthesizer at least with respect to one operational parameter. The external receiver circuitry may comprise a first receiver and the internal receiver circuitry may comprise a second receiver, with the first receiver having better performance than the second receiver at least with respect to one operational parameter.

The test instrument may comprise back-end circuitry that is connectable to a device interface board (DIB) and test programs that are executable to test the DUT, with the back-end circuitry and the test programs being usable, without modification to the device interface board, with both (i) the internal source circuitry and the internal receiver circuitry, and (ii) external source circuitry and external receiver circuitry. The internal source circuitry and the internal receiver circuitry may be used when DUT performance or test program limits do not require a performance level that is above a threshold, and external source circuitry and external receiver circuitry may be used when the DUT performance or test program limits require a performance level that is above the threshold.

Example ATE may comprise a test instrument for outputting test signals to test a device under test (DUT), and for receiving output signals from the DUT, with the test instrument comprising a front-end module that comprises: internal source circuitry to perform part of generating the test signals to be output by the test instrument; and internal receiver circuitry to perform part of receiving the output signals from the DUT and to pass the output signals to test circuitry. The ATE may comprise external source circuitry to perform part of generating the test signals to be output by the test instrument, with the external source circuitry being partly or completely outside the front-end module; and external receiver circuitry to perform part of receiving the response signals and to pass the output signals to the test circuitry, with the external receiver circuitry being partly or completely outside the front-end module. The example ATE may include any one or more of the following features, either alone or in combination.

The external source circuitry may comprise a synthesizer or a first modulated synthesizer, and the internal source circuitry may comprise a second synthesizer or second modulated synthesizer. The external receiver circuitry may comprise a first synthesized receiver, and the internal receiver circuitry may comprise a second synthesizer and receiver. The ATE may comprise a multiplexer or signal splitter to connect at least one of the external source circuitry or the external receiver circuitry to another test instrument comprising another front end module.

The ATE may comprise one or more processing devices to configure the test instrument to use either (i) the internal source circuitry and the internal receiver circuitry, or (ii) the external source circuitry and the external receiver circuitry, or (iii) a combination comprising the internal source circuitry, the internal receiver circuitry, the external source circuitry, or the external receiver circuitry. The test instrument may be configured to perform radio frequency tests on the DUT.

Example automatic test equipment (ATE) comprises: a test instrument for outputting test signals to test a device under test (DUT), and for receiving output signals from the DUT, with the test instrument including a front-end module, and with the front-end module including internal circuitry for performing functions relating to the DUT; and external circuitry for performing the functions relative to the DUT via the test instrument, with the external circuitry being external to the front-end module and being shared among multiple front-end modules or channels of the test instrument. The test instrument is configurable to use either (i) the internal circuitry, (ii) the external circuitry, or (iii) a combination of circuits in the internal circuitry and the external circuitry to perform the functions. The example ATE may include any one or more of the following features, either alone or in combination.

The functions may comprise sourcing signals corresponding to the test signals. The functions may comprise receiving signals corresponding to the response signals. Circuitry inside the front-end module may comprise a first synthesizer or first modulated synthesizer and the circuitry outside the front-end module may comprise a second synthesizer or second modulated synthesizer, with the second synthesizer having better performance than the first synthesizer with respect to one or more operational parameters.

The one or more operational parameters may comprise one of more of the following: phase noise, frequency resolution, harmonic distribution, spurious emissions, error vector magnitude, adjacent channel power ratio, modulation bandwidth, two-tone intermodulation, or inband intermodulation, amplitude and frequency switching speed, amplitude and frequency settling time, frequency and amplitude range, signal isolation, number of carriers, sample clock rate, information bandwidth, intercept points, modulation type, modulation depth and deviation, harmonics and sub-harmonics, adjacent channel rejection, bit rate, dynamic error vector magnitude, symbols, eye diagram, frequency error, amplitude flatness, phase linearity, gain and phase imbalance, image rejection, noise figure, saturated power, pulling or pushing, return loss or reflection coefficient, ruggedness, spurious free dynamic range, spectral mask, signal-to-noise ratio, stability, rise and fall time, 4FMOD, capture or source memory depth, FFT speed, AC/DC coupling, aging, or temperature stability.

The internal circuitry may comprise an I/Q or other modulator that is connectable to or part of the first synthesizer or the second synthesizer. The ATE may comprise a selector circuit to connect the external circuitry to another instrument front-end module or channel that includes another front end module. The internal circuitry may be used when the DUT performance or test program limits are not required to exceed a threshold, and the external circuitry may be used when the DUT performance or test program limits are required to exceed the threshold.

Any two or more of the features described in this specification, including in this summary section, can be combined to form implementations not specifically described herein.

The test systems and techniques described herein, or portions thereof, can be implemented as/controlled by a computer program product that includes instructions that are stored on one or more non-transitory machine-readable storage media, and that are executable on one or more processing devices to control (e.g., coordinate) the operations described herein. The test systems and techniques described herein, or portions thereof, can be implemented as an apparatus, method, or electronic system that can include one or more processing devices and memory to store executable instructions to implement various operations.

The details of one or more implementations are set forth in the accompanying drawings and the description below. Other features and advantages will be apparent from the description and drawings, and from the claims.

DESCRIPTION OF THE DRAWINGS

Like reference numerals in different figures indicate like elements.

DETAILED DESCRIPTION

Figure 1:
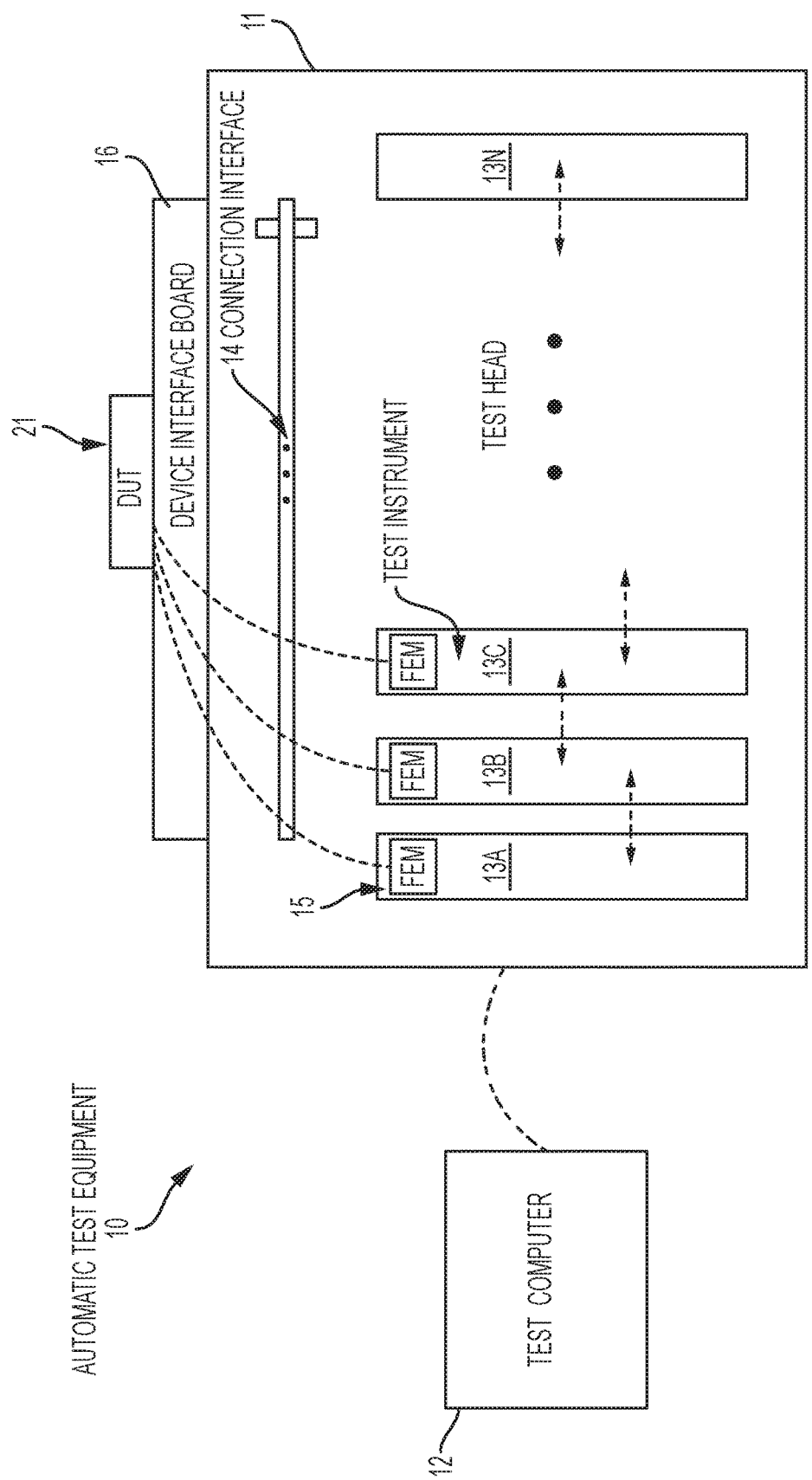
FIG. 1 is a block diagram of an example test system.

Described herein are examples of FEMs that may be used in test instruments in ATE. The FEMs enable use of either higher performance, higher cost circuitry or lower performance, lower cost circuitry to perform testing. In this context, "high" and "low" do not have any specific numerical connotations, but rather are indicative of relative values, such as performance and cost. By enabling use of either higher performance, higher cost circuitry or lower performance, lower cost circuitry, the ATE provides enhanced test flexibility. For example, through use of the higher performance, higher cost circuitry, the ATE may be used for high accuracy testing of more expensive circuitry, such as RF circuits for use in cellular telephones. Alternatively, through use of the lower performance, lower cost circuitry, the ATE may be used for higher volume, lower cost testing of lower cost components, such as wireless thermostats, sports watches, or product tags.

In an example implementation, the ATE includes a test instrument for outputting test signals to test a DUT, and for receiving output signals from the DUT. The test instrument includes an FEM having internal source circuitry to generate the test signals, or to contribute to generation of the test signals, to be provided by the test instrument; and internal receiver circuitry to receive the output signals. The ATE also includes source circuitry, all or part of which is external to the FEM to generate test signals, or to contribute to generation of the test signals, to be output by the test instrument; and receiver circuitry, all or part of which is external to the front-end module to receive the output signals. The test instrument is configurable to use (i) the internal source circuitry and the internal receiver circuitry, (ii) the external source circuitry and the external receiver circuitry, (iii) or combination comprised of the internal source circuitry, the internal receiver circuitry, the external source circuitry, or the external receiver circuitry. In this example, the internal circuitry is lower performance, lower cost circuitry and the external circuitry is higher performance, higher cost circuitry, and a user can select which to use. For example, if the user would like to perform high volume testing of lower cost parts, then the user may configure the ATE to use the internal source and receiver circuitry, and not purchase or use the external source and receiver circuitry, thereby decreasing testing cost.

In this context, performance can be measured based on any appropriate operational parameters. The external circuitry may have, as appropriate, better performance than the internal circuitry with respect to one or more of the following example operational parameters: phase noise, frequency resolution, harmonic distribution, spurious emissions, error vector magnitude, adjacent channel power ratio, modulation bandwidth, two-tone intermodulation, inband intermodulation, amplitude and frequency switching speed, amplitude and frequency settling time, frequency and amplitude range, signal isolation, number of carriers, sample clock rate, information bandwidth, intercept points, modulation type, modulation depth and deviation, harmonics and sub-harmonics, adjacent channel rejection, bit rate, dynamic error vector magnitude, symbols, eye diagram, frequency error, amplitude flatness, phase linearity, gain and phase imbalance, image rejection, noise figure, saturated power, pulling or pushing, return loss or reflection coefficient, ruggedness, spurious free dynamic range, spectral mask, signal-to-noise ratio, stability, rise and fall time, 4FMOD, capture or source memory depth, fast Fourier transform (FFT) speed, AC/DC coupling, aging, or temperature stability. Other appropriate parameters, not listed here, may also be used as a basis for performance measurement, either alone or in combination with one or more of the foregoing parameters.

In some implementations, the internal source and the internal receiver are used when DUT performance or test program limits do not require a performance that is better than a threshold, and the external source and external receiver are used when the DUT performance or test program limits require a performance level that is better than the threshold. For example, if the DUT performance and test program require any one or more of the foregoing operational parameters to meet or exceed a specification value, then the external source and the external receiver are used. However, if the DUT performance and test program do not require any one or more of the foregoing operational parameters to meet or exceed that specification value, either the external source and external receiver or the internal source and internal receiver may be used. The internal source and internal receiver may be preferred in such an instance, since they are less expensive and may reduce testing costs or improve throughput.

Figure 2:
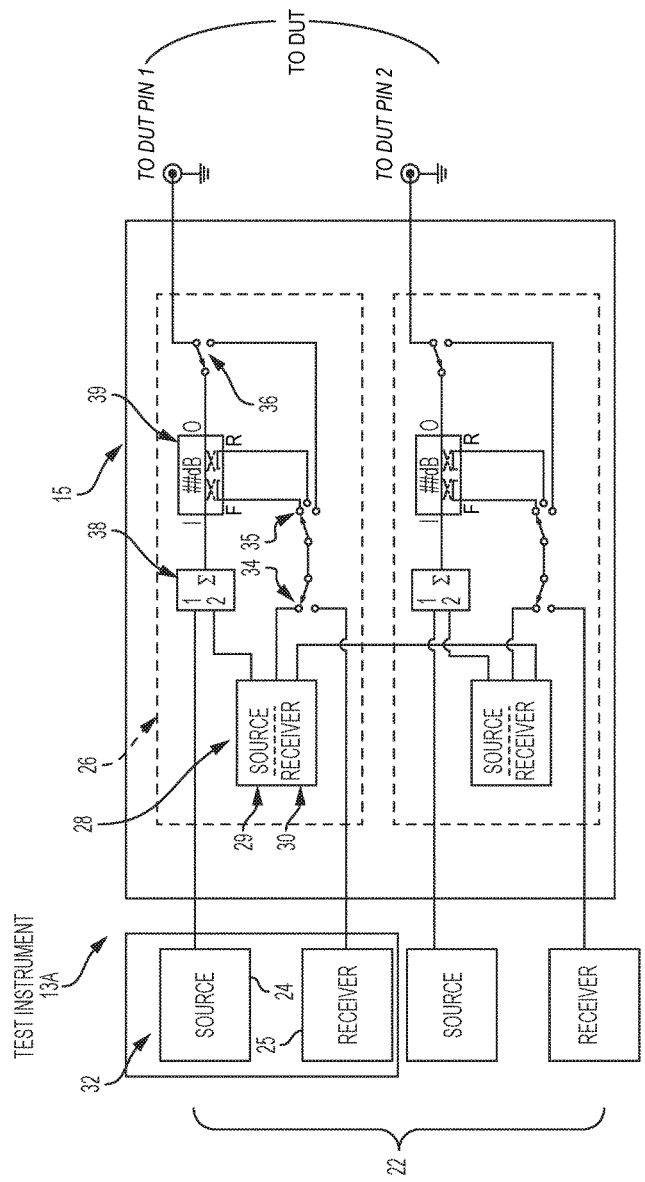
FIG. 2 is a block diagram of part of a test system that includes an example FEM.

FIGS. 1 and 2 show an example implementation of ATE 10 that includes a FEM 15 and external circuitry of the type described herein that may be used with a test instrument 13A. As shown in FIG. 1, test instrument 13A may be part of a test head 11 that includes multiple test instruments or parts of test instruments 13A to 13N, which communicate separately to a DUT 21 over a connection interface 14, to each other, and to a device interface board (DIB) 16. In the example of FIG. 1, the dotted lines indicate potential communication paths. For example, source 24 and receiver 25 might reside on instrument 13A while hybrid FEM 15 resides on instrument 13B. In this regard, in some implementations, a single test device may include multiple instruments 13A through 13N. In some implementations, a single test instrument may have multiple channels on a single card. An example implementation includes multiple channels on a single card and multiple copies of source and receiver circuitry on another card, which all together make up a single multi-channel instrument.

Referring to FIG. 2, test instrument 13A includes external circuitry 22, which is external in the sense that it is not within FEM 15. In this example, external circuitry 22 includes external source 24 and external receiver 25, or component(s) thereof, as described in more detail below. External source 24 and external receiver 25 are for a single FEM channel 26. In this example, a second FEM channel includes its own external source and receiver, as shown, which operate in the same manner as external source 24 and external receiver 25. External source 24 is configured to output signals to the DUT, through FEM 15, for testing or other purposes; external receiver 25 is configured to receive signals from the DUT, through FEM 15, and to output those signals to other circuitry in the test instrument or elsewhere. In some implementations, external source 24 contributes to the signals output to the DUT. For example, modulation may be added to those signals or those signals may be combined to reduce phase noise or may be otherwise modified in some useful way prior to output to the DUT.

Internal circuitry 28 includes internal source 29 and internal receiver 30, which are internal in the sense that they are within FEM 15. Internal source 29 and internal receiver 30 are for a single FEM channel 26. In this example, a second FEM channel includes its own internal source and receiver, as shown, which operate in the same manner as internal source 29 and internal receiver 30. Internal source 29 is configured to output signals to the DUT, through FEM 15, for testing or other purposes; internal receiver 30 is configured to receive signals from the DUT, through FEM 15, and to output those signals to other circuitry in the test instrument. In some implementations, internal source 29 contributes to the signals output to the DUT. For example, as in the case of the external source, modulation may be added to those signals or those signals may be modified in some useful way prior to output.

Thus, in the above example, both the internal circuitry and the external circuitry perform the same functions (e.g., sourcing and receiving signals). However, as described herein, the external circuitry is more high performance, and thus may be higher in cost, than the internal circuitry. The external circuitry may be physically larger to support the increased performance and may be more expensive to manufacture. In some implementations, the internal and external circuitry may perform different functions as well. For example, the external circuitry may have a wider range of functionality available due to its advanced capabilities relative to the internal circuitry.

A user can configure the ATE to perform testing with either the internal circuitry or the external circuitry, depending upon the testing to be performed. As noted, if high accuracy testing of more expensive circuitry, such as complex RF transceiver circuits for use in cellular telephones, is being performed, then the user may configure the ATE to use the external circuitry for testing. If, on the other hand, the ATE is being used to test high volume of lower cost components, such as wireless thermostats, sports watches, or product tags, then the user may configure the ATE to use the internal circuitry for testing. In some implementations, switches or other circuit elements may be programmed to configure the ATE. For example, referring to FIG. 1, the ATE may include a test computer 12, which communicates with the test instruments. The test computer may be any appropriate type of computing device having memory for storing instructions that comprise one or more computer programs, and one or more processing devices to execute those instructions. One or more computer programs executing on test computer 12 thus may configure the switches or other circuitry in the FEM to use either the internal circuitry, the external circuitry, or some combination thereof.

In the example of FIG. 2, each FEM channel includes an internal circuit, which includes internal source 29 and internal receiver 30. In some implementations, each FEM channel is associated with a single external circuit 32, which includes external source 24 and external receiver 25. Switches 34, 35, and 36 are controllable to configure FEM 15 to transmit signals either from internal source 29 or from external source 24. Likewise, switches 34, 35, and 36 are controllable to configure FEM 15 to receive signals either via internal receiver 30 or via external receiver 25. The internal and external circuitry may also be controllable by the test computer, e.g., to source signals having specified characteristics, or to process received signals prior to output to other components of the test instrument.

In the example implementation of FIG. 2, signals output to the DUT are routed through circuit 38, and signals from the DUT may be routed through circuit 39. Circuit 38 may be used to combine the external source 24 with the internal source 29. For example, the high performance source 24 may be modulated with high quality while source 29 emulates a blocking tone. The directional coupler 39 or its equivalent are used to separate signals into forward and reflected waves for measurement by receiver 30 or 25. This is used for calibrations and measurement of DUT s-parameters.

Not shown are components which amplify and attenuate the signal to precisely set its amplitude. These are distributed along the path as appropriate to meet performance requirements like maximum power, noise figure, etc. while maintaining the desired linearity. Also, in some implementations, the circuitry may multiplex or split the signals after switch 36 and prior to the DUT.

In some implementations, external source 24 and/or external receiver 25 are sharable across multiple FEMs. This is commonly done to save costs at the expense of increased test times. For example, external source 24 and/or external receiver 25 may be connected to, and service, different FEMs. In an example, the external source and receiver may be connected to multiple FEMs through a multiplexer, signal splitter, switches, or other appropriate selector circuitry to (not shown) enable sourcing signals to, and receiving signals from, different FEMs serially. In some implementations, different FEMs may each have their own external source and/or external receiver. For example, an FEM may have a single external source and a single external receiver that services each channel of the FEM. In a case that the FEM includes multiple channels, a selector circuit, e.g., of the type described above, may be used to implement sharing of the external source and external receiver among the multiple channels of the FEM. In some implementations, such as that of FIG. 2, individual FEM channels each have their own external source and external receiver circuitry.

Figure 3:
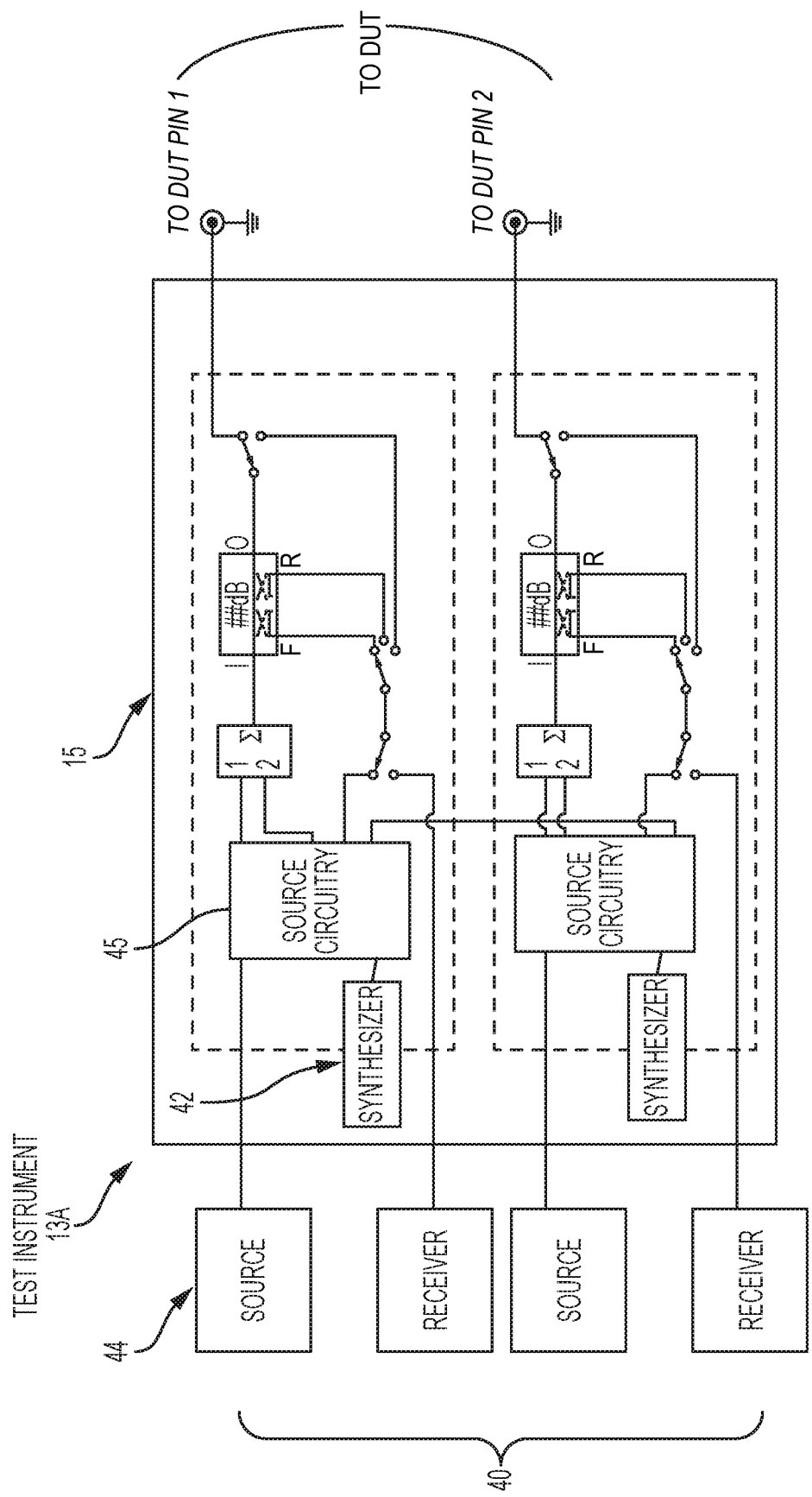
FIG. 3 is a block diagram of part of a test system that includes an example FEM.

Referring to FIG. 3, in some implementations, the external circuitry 40 of a FEM 39 may only include a subset (or part) of the circuitry used to perform the sourcing and receiving functions described herein. For example, the external source and external receiver may each include parts that are quite expensive (e.g., tens of thousands of dollars) and parts that are considerably less expensive (e.g., tens or hundreds of dollars). The less expensive parts of each may be incorporated into the FEM and be used as part of the less expensive internal FEM circuitry, and the more expensive parts of each may be made external to the FEM.

By way of example, source circuitry inside FEM 15 may include a first synthesizer or first modulated synthesizer 42, and source circuitry 44 outside of FEM 15 may include a second synthesizer or second modulated synthesizer. The second synthesizer has better performance than first synthesizer 42 with respect to one or more of the operational parameters described above, and thus may be more expensive. Both the first synthesizer and the second synthesizer may be part of source circuitry for generating, or contributing to, signal output from the ATE to the DUT. The remainder 45 of the source circuitry may be usable with either the first synthesizer or the second synthesizer to generate output signals. The first synthesizer or the second synthesizer may be selected, e.g., by a computer program running on the test computer based on whether performance or cost is more important in the testing process, with the better performing, second synthesizer being used when performance is more important than cost and with the first synthesizer being used when cost is more important than performance. In this example, circuitry 45 internal to the FEM may include an inphase/quadrature (I/Q) or other modulator that is connectable to, or part of, the first synthesizer or the second synthesizer. In a similar way, components of the receiver may be broken-out of the FEM, and made external.

Above, a synthesizer is only one example of circuitry that may be made external to the FEM. Any appropriate circuitry, whether it be analog or digital, may be made external to the FEM and configured to operate with internal FEM circuitry.

In some implementations, the internal source and receiver circuitry may be implemented using one or more transceivers, and the external source and receiver circuitry may be implemented using one or more transceivers. In some implementations, the circuitry that is external to the FEM and the circuitry that is internal to the FEM is not limited to, or does not include, sourcing and receiving circuitry. Rather, any appropriate functionality may be duplicated with external and internal FEM circuitry having different performance and costs, with the ATE being configurable to select either the external circuitry or the internal circuitry based on whether performance or cost is a priority. Furthermore, the concept of duplicating functionality externally and internally (with the external functionality being higher performance than the internal functionality and selectable for use) is not limited to use with FEMs or ATE, but rather may be used in any appropriate context to configure a device to operate based on whether performance or cost is a priority.

The utility of the two configurations (e.g., internal versus external) becomes apparent when realizing that the instrument allows a tester to be used for high performance characterization of the DUT (external resources 24, 25) as is necessary during bring-up of a new part design. When the DUT's design has been stabilized, the instrument may be reconfigured for lowest cost during volume production by using the internal resources 29, 30. The important signal connections from 15 to 21 are maintained constant across both instances saving debug and correlation time while improving time to market While this specification describes example implementations related to "testing" and a "test system," the devices and methods described herein may be used in any appropriate system, and are not limited to test systems or to the example test systems described herein.

Testing performed as described herein may be implemented and/or controlled using hardware or a combination of hardware and software. For example, a test system like the ones described herein may include various controllers and/or processing devices located at various points. A central computer may coordinate operation among the various controllers or processing devices. The central computer, controllers, and processing devices may execute various software routines to effect control and coordination of testing and calibration.

Testing can be controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the testing and calibration can be performed by one or more programmable processors executing one or more computer programs to perform the functions described herein. All or part of the testing and calibration can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Any "electrical connection" as used herein may imply a direct physical connection or a wired or wireless connection that includes intervening components but that nevertheless allows electrical signals to flow between connected components. Any "connection" involving electrical circuitry mentioned herein, unless stated otherwise, includes an electrical connection and not necessarily a direct physical connection regardless of whether the word "electrical" is used to modify "connection". Any "connection" between structural components as used herein may imply a direct physical connection or a physical connection that includes intervening one or more intervening components or other structures.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. Automatic test equipment (ATE) comprising:
   a test instrument for outputting test signals to test a device under test (DUT), and for receiving output signals from the DUT, the test instrument comprising a front-end module, the front-end module comprising:
      internal source circuitry to generate the test signals to be provided by the test instrument; and
      internal receiver circuitry to receive the output signals;
   external source circuitry that is external to the front-end module to generate the test signals to be output by the test instrument; and
   external receiver circuitry that is external to the front-end module to receive the output signals;
   wherein the test instrument is configurable to use one of (i) the internal source circuitry and the internal receiver circuitry, or (ii) the external source circuitry and the external receiver circuitry.

2. The ATE of claim 1, wherein at least one of the external source circuitry or the external receiver circuitry is sharable across multiple front-end modules.

3. The ATE of claim 1, wherein both the external source circuitry and the external receiver circuitry are sharable across multiple front-end modules.

4. The ATE of claim 1, wherein the internal source circuitry and the internal receiver circuitry are part of an internal transceiver, the external source circuitry having better phase noise performance than the internal source circuitry.

5. The ATE of claim 1, wherein the internal source circuitry and the internal receiver circuitry are part of an internal transceiver, the external receiver circuitry having better phase noise performance than the internal receiver circuitry.

6. The ATE of claim 1, wherein the external source circuitry provides better performance than the internal source circuitry with respect to one or more of the following parameters: frequency resolution, phase noise, harmonic distribution, spurious emissions, error vector magnitude, adjacent channel power ratio, modulation bandwidth, two-tone intermodulation, or inband intermodulation.

7. The ATE of claim 1, wherein the external receiver circuitry provides better performance than the internal receiver circuitry with respect to one or more of the following parameters: frequency resolution, phase noise, harmonic distribution, spurious emissions, error vector magnitude, adjacent channel power ratio, modulation bandwidth, two-tone intermodulation, or inband intermodulation.

8. The ATE of claim 1, further comprising:
   one or more processing devices to configure the test instrument to use either (i) the internal source circuitry and the internal receiver circuitry, or (ii) external source circuitry and external receiver circuitry.

9. The ATE of claim 1, wherein the external source circuitry comprises a first synthesizer and the internal source circuitry comprises a second synthesizer, the first synthesizer having better performance than the second synthesizer at least with respect to one operational parameter.

10. The ATE of claim 1, wherein the external receiver circuitry comprises a first receiver and the internal receiver circuitry comprises a second receiver, the first receiver having better performance than the second receiver at least with respect to one operational parameter.

11. The ATE of claim 1, wherein the test instrument comprises back-end circuitry that is connectable to a device interface board and test programs that are executable to test the DUT, the back-end circuitry and the test programs being usable, without modification to the device interface board, with both (i) the internal source circuitry and the internal receiver circuitry, and (ii) external source circuitry and external receiver circuitry.

12. The ATE of claim 1, wherein the internal source circuitry and the internal receiver circuitry are used when DUT performance or test program limits do not require a performance level that is above a threshold, and the external source circuitry and external receiver circuitry are used when the DUT performance or test program limits require a performance level that is above the threshold.

13. Automatic test equipment (ATE) comprising:
a test instrument for outputting test signals to test a device under test (DUT), and for receiving output signals from the DUT, the test instrument comprising a front-end module, the front-end module comprising:
internal source circuitry to perform generating the test signals to be output by the test instrument; and
internal receiver circuitry to perform receiving the output signals from the DUT and to pass the output signals to test circuitry;
external source circuitry to perform generating the test signals to be output by the test instrument, the external source circuitry being partly or completely outside the front-end module;
external receiver circuitry to perform receiving the response signals and to pass the output signals to the test circuitry, the external receiver circuitry being partly or completely outside the front-end module; and
one or more processing devices to configure the test instrument to use one of (i) the internal source circuitry and the internal receiver circuitry, or (ii) the external source circuitry and the external receiver circuitry.

14. The ATE of claim 13, wherein the external source circuitry comprises a first synthesizer or a first modulated synthesizer, and the internal source circuitry comprises a second synthesizer or second modulated synthesizer.

15. The ATE of claim 13, wherein the external receiver circuitry comprises a first synthesized receiver, and the internal receiver circuitry comprises a second synthesizer and receiver.

16. The ATE of claim 13, further comprising:
a multiplexer or signal splitter to connect at least one of the external source circuitry or the external receiver circuitry to another test instrument comprising another front end module.

17. The ATE of claim 13, wherein the test instrument is configured to perform radio frequency tests on the DUT.

18. Automatic test equipment (ATE) comprising:
a test instrument for outputting test signals to test a device under test (DUT), and for receiving output signals from the DUT, the test instrument comprising a front-end module, the front-end module comprising internal circuitry for performing functions relating to the DUT; and
external circuitry for performing the functions relating to the DUT via the test instrument, the external circuitry being external to the front-end module and being shared among multiple front-end modules or channels of the test instrument;
wherein the test instrument is configurable to use one of (i) the internal circuitry, or (ii) the external circuitry to perform the functions.

19. The ATE of claim 18, wherein the functions comprise sourcing signals corresponding to the test signals.

20. The ATE of claim 18, wherein the functions comprise receiving signals corresponding to the response signals.

21. The ATE of claim 18, wherein circuitry inside the front-end module comprises a first synthesizer or first modulated synthesizer and the circuitry outside the front-end module comprises a second synthesizer or second modulated synthesizer, the second synthesizer having better performance than the first synthesizer with respect to one or more operational parameters.

22. The ATE of claim 21, wherein the one or more operational parameters comprise one of more of the following: phase noise, frequency resolution, harmonic distribution, spurious emissions, error vector magnitude, adjacent channel power ratio, modulation bandwidth, two-tone intermodulation, inband intermodulation, amplitude and frequency switching speed, amplitude and frequency settling time, frequency and amplitude range, signal isolation, number of carriers, sample clock rate, information bandwidth, intercept points, modulation type, modulation depth and deviation, harmonics and sub-harmonics, adjacent channel rejection, bit rate, dynamic error vector magnitude, symbols, eye diagram, frequency error, amplitude flatness, phase linearity, gain and phase imbalance, image rejection, noise figure, saturated power, pulling or pushing, return loss or reflection coefficient, ruggedness, spurious free dynamic range, spectral mask, signal-to-noise ratio, stability, rise and fall time, 4FMOD, capture or source memory depth, FFT speed, AC/DC coupling, aging, or temperature stability.

23. The ATE of claim 21, wherein the internal circuitry comprises an I/Q or other modulator that is connectable to or part of the first synthesizer or the second synthesizer.

24. The ATE of claim 18, further comprising:
a selector circuit to connect the external circuitry to another instrument front-end module or channel that includes another front end module.

25. The ATE of claim 18, wherein the internal circuitry is used when the DUT performance or test program limits are not required to exceed a threshold, and the external circuitry is used when the DUT performance or test program limits are required to exceed the threshold.

* * * * *

UNITED STATES PATENT AND TRADEMARK OFFICE
CERTIFICATE OF CORRECTION

PATENT NO. : 9,755,766 B2  
APPLICATION NO. : 14/946311  
DATED : September 5, 2017  
INVENTOR(S) : Brian C. Wadell et al.

It is certified that error appears in the above-identified patent and that said Letters Patent is hereby corrected as shown below:

In the Claims

Column 12, Claim 21, Line 17: Insert --the internal-- between "wherein" and "circuitry"

Column 12, Claim 21, Line 19: Insert --external-- between "the" and "circuitry"

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*